Oct. 7, 1958 M. ALDEN 2,855,454

HOUSING FOR MOUNTING ELECTRICAL CIRCUIT COMPONENTS

Filed Oct. 29, 1953 3 Sheets-Sheet 1

Inventor
Milton Alden
by Davis, Hoxie & Faithfull
att'ys.

HOUSING FOR MOUNTING ELECTRICAL CIRCUIT COMPONENTS

Filed Oct. 29, 1953 3 Sheets-Sheet 2

Inventor
Milton Alden
by Davis, Hoxie + Faithfull
att'ys.

HOUSING FOR MOUNTING ELECTRICAL CIRCUIT COMPONENTS

Filed Oct. 29, 1953 3 Sheets-Sheet 3

Inventor
Milton Alden
by Davis, Hoxie & Faithfull
att'ys.

United States Patent Office 2,855,454

Patented Oct. 7, 1958

2,855,454

HOUSING FOR MOUNTING ELECTRICAL CIRCUIT COMPONENTS

Milton Alden, Wellesley, Mass.

Application October 29, 1953, Serial No. 389,020

13 Claims. (Cl. 174—59)

This invention relates to a housing such as is used for mounting electrical and electronic circuit components such as tubes, resistors, capacitors and the like, and more particularly to a housing which is adapted interchangeably to be inserted or plugged into a supporting frame or casing.

The conventional box-like chassis as has been in general use heretofore has been formed of a horizontal mounting panel of sheet material to which one or more side walls are welded. Sockets for plug-in components, tubes, transformers and similar circuit elements are secured in circular openings through the panel, and smaller components, such as resistors and capacitors, are soldered in place on the underside of the panel. For rigidity, the chassis is usually secured to a frame which has a front panel whereupon are mounted the variable controls. As is well known in the industry, the wiring of a chassis constructed in the above-described manner is difficult and time-consuming and even more troublesome to repair in the field, as access to the underside of the chassis is obstructed while it is secured to the frame. Such a chassis has also been found by experience to be expensive, poorly adapted to modern assembly line fabrication, and not to lend itself to rapid installation in a frame or casing or to interchangeability.

Accordingly, a principal object of the present invention is to provide a housing assembly unit with separate structural parts, each of which may be separately and economically fabricated from sheet metal stock by simple punching and pressing operations particularly adapted to continuous flow production.

Another principal object is to provide structural parts on which the components may be mounted and wired prior to assembly of the parts in a unit, thus further facilitating the use of rapid assembly line techniques.

A further object is to provide a housing which can be simply and easily wired electrically and mechanically assembled with its supporting structure to facilitate maintenance and minimize shutdown time of electrical equipment.

Other objects of the invention are to provide a housing which is attractive in appearance, which is rugged in construction, which is adapted to mass production techniques and which advances the electrical art generally.

A housing according to the present invention comprises two telescoping channel-shaped sheet metal sections whose web portions are maintained in spaced relationship by respective pairs of flanges which extend from opposite sides of the webs, the pairs of flanges being at right angles to each other to form an enclosure for electrical and electronic components, one sheet metal section preferably forming a chassis and being provided with means for mounting and connecting the components and the other section acting as a support for the chassis section. Detent means, preferably cam-operated, are provided to bring and maintain the sections in telescoped relationship.

These and other objects and aspects of the invention will be apparent from the following description of a specific embodiment of the invention which refers to drawings wherein.

Figure 1:
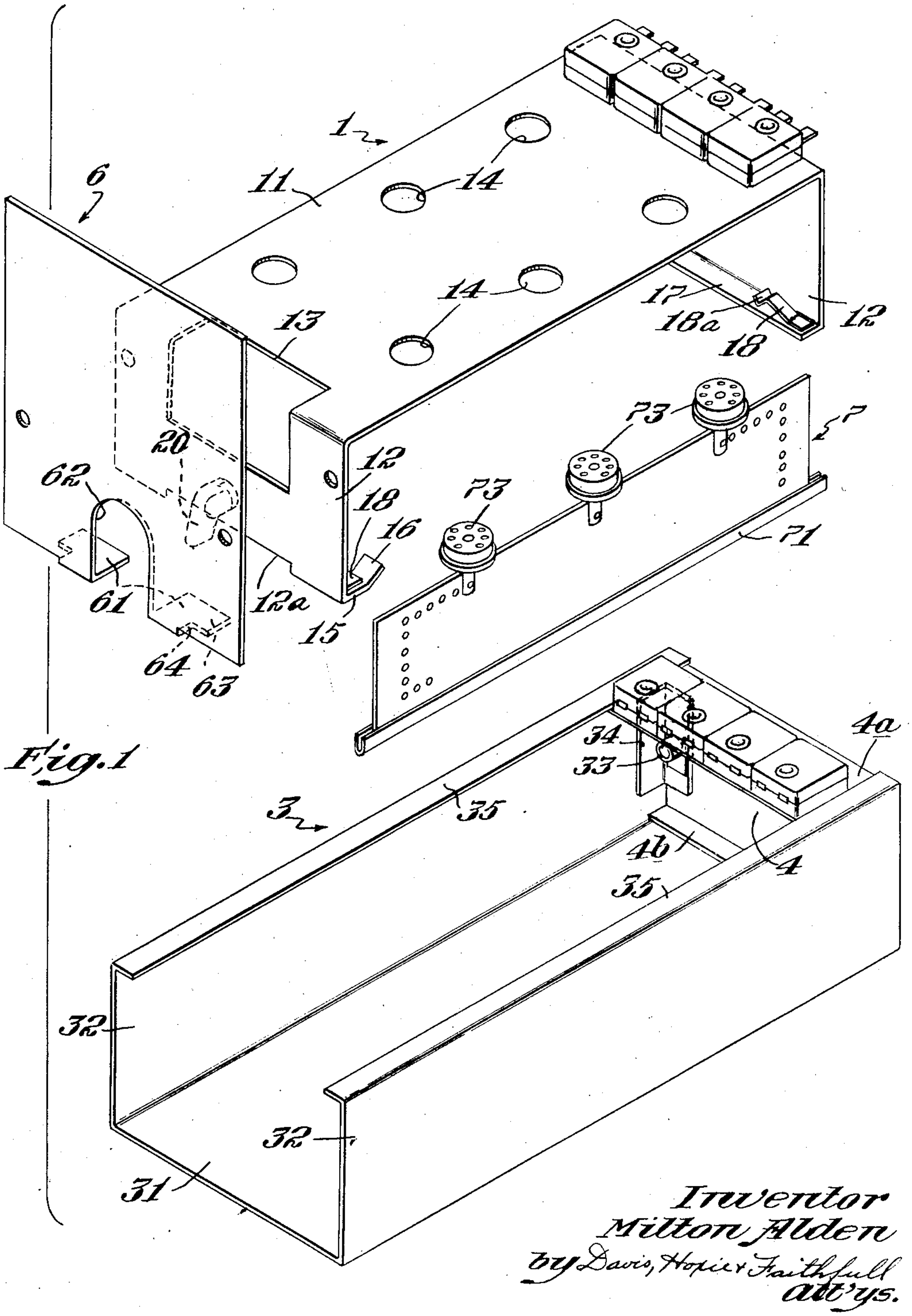
Fig. 1 is an exploded isometric view showing the parts of a housing assembly.
Figure 2:
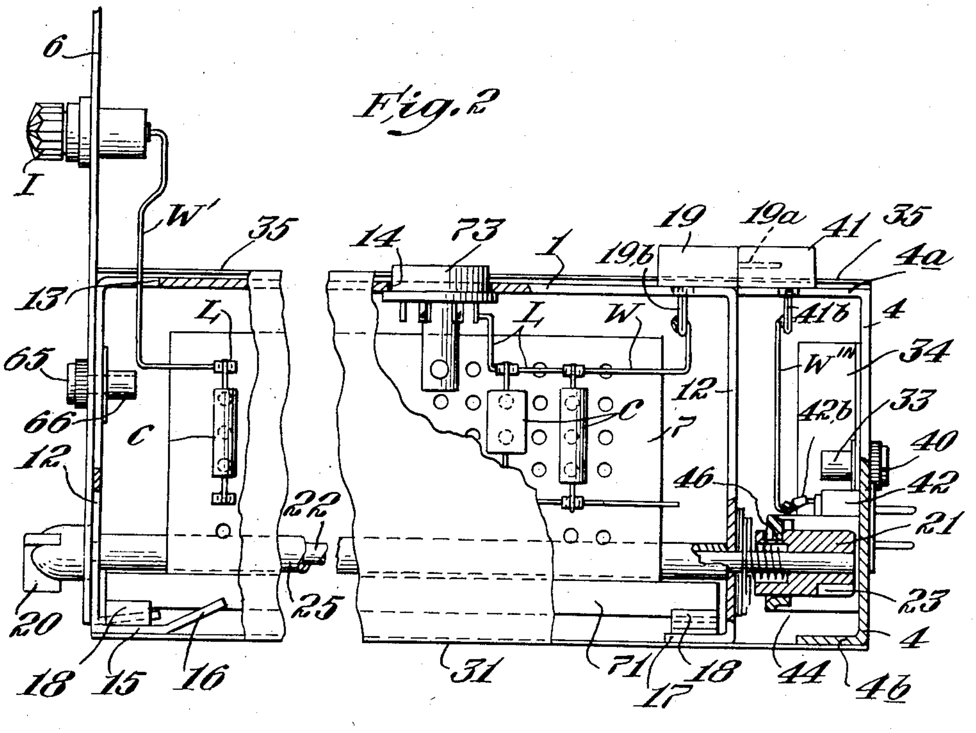
Fig. 2 is a side elevation view in partial section showing the housing elements assembled.

As is best illustrated in Fig. 1, the housing comprises two channel-shaped sheet metal sections 1 and 3. The section 1 has a web portion 11 and a pair of flanges 12 which depend at right angles from the opposite ends of web portion 11 to form a chassis for mounting electrical components as will be described in detail hereinafter. Similarly, the supporting section 3 includes a web portion 31 and a pair of flanges 32 which are bent upwardly normal to the plane of the web 31. The lower edges of the front and rear flanges 12 of the chassis section 1 are provided with inwardly turned lips 15 and 17, respectively, disposed parallel to the plane of the web portion 11, which when the sections are telescoped, as shown in Fig. 2, act as runners or skids for bearing against the upper surface of the supporting section web 31, thus facilitating the assembling of the sections 1 and 3, the assembling of the sections being further facilitated by bending the extended ends of the front lip 15 upwardly as at 16. The top edges of the supporting section flanges 32 are likewise provided with lips 35 which are turned parallel to the plane of the web portion 31 so that the lips rest upon the top surface of the web portion 11 of the chassis section 1 to prevent the separation of the sections.

The rear of the supporting section 3 is closed by means of a bridging cross member such as the back plate 4 provided with two opposed inwardly turned flanges *4a* and *4b* which bear, respectively, against the inner surfaces of the lips 35 and the web portion 31. The back plate 4 is attached to the supporting channel by two cap screws 40 (Fig. 2) which project through screw holes in the plate to engage the threads of cylindrical nuts 33. As is best shown in Fig. 1, each nut 33 is provided with a flange which is spot-welded to a respective angle bracket 34 spot-welded to the channel flange 32.

Figures 3, 4, 8:
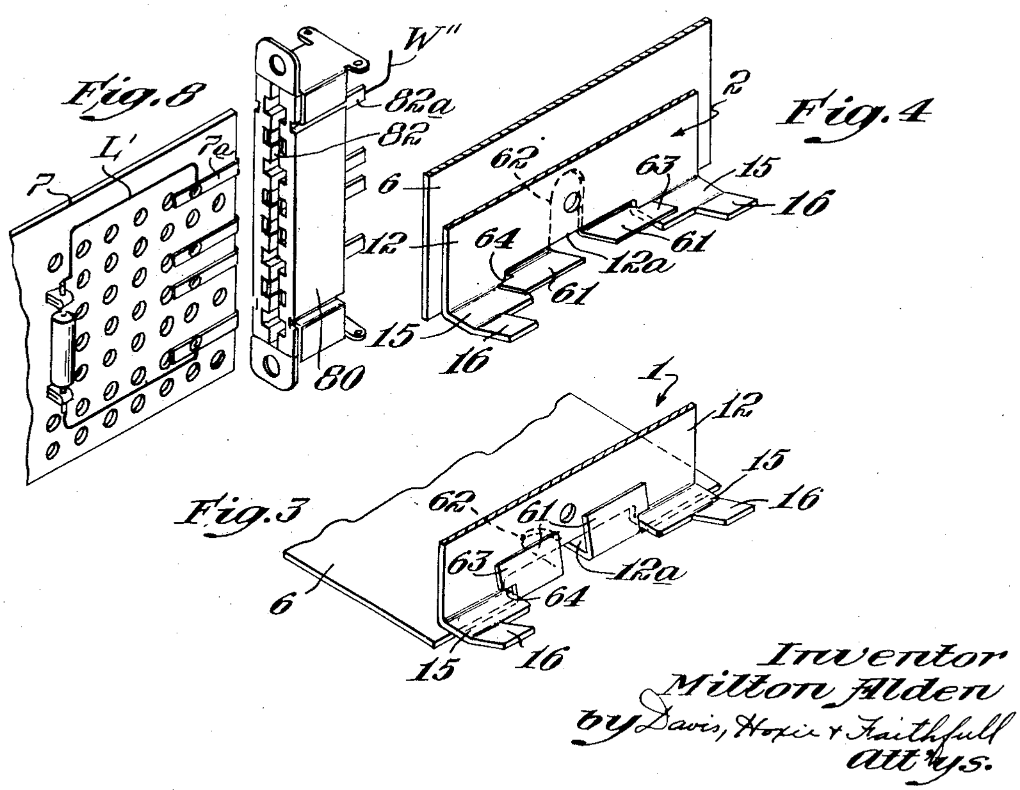
Figs. 3 and 4 are fragmentary isometric views showing details of the manner of attaching the front panel.
Fig. 8 is a fragmentary isometric view showing an alternative means for completing the electrical connections.

The chassis section 1 carries an auxiliary front panel 6 which is hinged thereto as will be described below. To this end, the lower edge of the panel 6 is provided with a bifurcated tongue 61 extending inwardly at right angles to the plane of the panel, the tongue being split into two portions by the slot 62, the purpose of which will appear hereinafter. Each end of the tongue is undercut as at 64 to form two projections such as the tabs 63. As can be seen in Fig. 3, the front flange 12 and its associated lip 15 are cut away as at *12a* so that, when the panel 6 is at substantially a right angle to the flange, the cut will receive the tongue 61 with its tabs 63 projecting over the separated portions of the lip to form a hinged connection. The front panel 6 is then moved into assembled position by pivoting it about the hinged connection so that the panel is parallel to and abutting the flange 12 as is shown in Fig. 4. The panel 6 is then locked in this position by two cap screws 65 (Figure 2) which project through aligned apertures in the panel and flange 12 to engage associated cylindrical nuts 66 whose flanges are welded to the inner surface of the flange.

Figure 6:
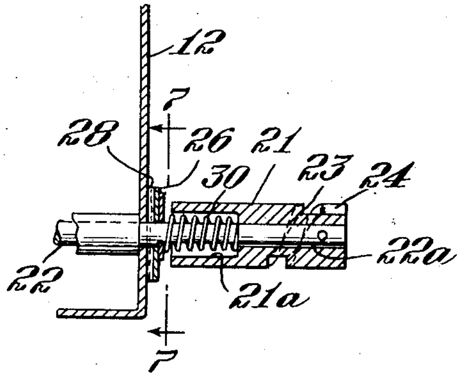
Fig. 6 is a sectional view of line 6—6 of Fig. 5.
Figure 7:
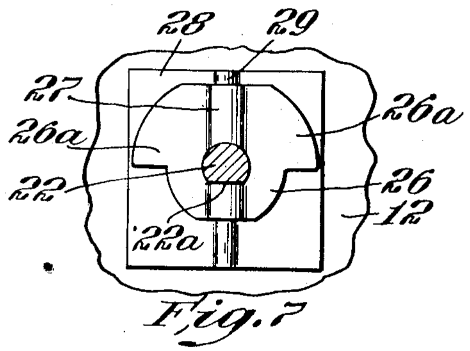
Fig. 7 is a sectional view of line 7—7 of Fig. 6.

The chassis and supporting channel sections 1 and 3 are brought and locked in telescoping relationship by detent means including a cylindrical cam 21 (Figs. 5, 6 and 7) having a cammed surface 23 which progresses axially along the periphery of the cam to terminate in the rear face thereof as at 24. The cam 21 is pinned to one end of a shaft 22 which is journaled in aligned apertures in the chassis section flanges 12 so that it can be manually rotated by a handle such as the knob 20 (Fig. 2) which is secured to the opposite end of the shaft. No shaft aperture is required in the front panel 6 because of the clearance provided by the slot 62 which permits the heretofore described hinge action of the panel without the necessity of removing the knob from the shaft 22. The portion of the shaft 22 extending between the flanges 12 is enclosed in a sleeve 25 of an electrical insulating material to preclude the possibility of the shaft grounding or shorting the electrical components or connections made within the chassis section 1.

The cylindrical cam 21 is aligned with a centrally disposed socket 45 in a U-shaped bracket 44 (Fig. 5) which extends inwardly from the back plate 4 so that the open end 24 of the cammed surface is moved into engagement with a key 46, which projects radially inward from the wall of the socket 45 as the channel sections 1 and 3 are initially moved into telescoping engagement. After the end 24 of the cammed surface 23 is in such engagement with the key 46, the knob 20 is manually rotated so as to draw the chassis section 1 into its final telescoped position. To maintain the cylindrical cam 21 locked in such position, a rotatable cam plate 26 (Fig. 6) is interposed between the outer face of the rear flange 12 and the end of the cylindrical cam. The end of the shaft 22 is provided with a flat portion **22*a* which engages a corresponding flat portion in an aperture through the cam plate 26 to prevent relative rotational movement therebetween. A raised embossment 29 transversely extends across a detent plate 28 which is spot-welded or otherwise secured to the outer face of the flange 12. A spring 30 is seated in an aperture 21*a* in the end of the cylindrical cam 21 which biases the cam plate 26 towards the detent plate 28 so that the embossment 29 is engaged by a similar embossment 27 in the cam plate to restrain rotation of the shaft 22. It will be evident that the engagement of the embossments 27 and 29 can take place in either of two shaft positions which are 180 degrees apart. The cammed surface 23 of the cylindrical cam 21 is oriented with respect to the shaft so that in one of the embossment-engaging positions the end 24 of the cammed surface is aligned to receive the key 46 and in the other position the camming action is complete and the telescoping sections 1 and 3 are locked in assembled position. To assist in the engaging of the embossments 27 and 29, two inclined wings 26*a* extend from the cam detent 26 so that the wings ride upon the top of of the embossment 29 as the cam detent is rotated by the shaft 22**.

Although it is of course possible to mount electrical components upon the chassis section 1 in the usual manner, I prefer to mount the electrical components C upon either side of a perforated plate 7 of an insulating material, along the upper edge of which are secured one or more tube sockets 73 in a manner described in detail in my copending patent application Serial No. 287,078, filed May 9, 1952. Rather than mounting the plate 7 upon a socket as was done in the aforementioned application, in the present instance a U-shaped channel member 71 (Figs. 1 and 2) is used which engages the lower edge of the plate along its entire length. The ends of the channel member 71 are engaged by clips 18, one end of which is provided with a groove **18*a* for receiving the bottom of the channel. The other ends of the clips 18 are welded to the lips 15 and 17 respectively, so that when the plate 7 is in assembled position, the tube sockets 73 project through the apertures 14 in the web 11 of the chassis section 1**.

The electrical components C and the tube sockets 73 mounted upon the plate 7 are interconnected by soldered leads L. Other leads W′, which are preferably flexible and of sufficient length to permit the front panel 6 to be let down as described heretofore, connect with components such as the pilot light I mounted on the front panel. Further leads W connect with the terminals **19*b* of male connectors 19 which are pivotally mounted by rivets 19*c* (Fig. 5) upon the top of the web 1 so that the bayonets 19*a* extend beyond the plane of the rear flange 12. The correlated female connectors 41 are similarly pivotally mounted by rivets 41*c* upon the top of the back plate flange 4*a* so that their contact apertures 41*a* are in a position to receive the bayonets 19*a* of the connectors 19 as the sections 1 and 3 are brought into final telescoped relationship by the action of the cylindrical cam 21** described in detail heretofore, the pivotal mounting of the connectors allowing slight movement to compensate for slight misalignments.

An alternative construction, having further flexibility which aids in rapid servicing and maintenance, is illustrated in Fig. 8 wherein the leads L′ from the components C are soldered to terminals **7*a* mounted at the rear edge of the plate 7 rather than connected directly to the connector terminals 19*b* as in Fig. 2. The terminals 7*a* are preferably of strips of a conducting material such as Phosphor bronze which is bent over the end of the plate 7 and secured by a rivet through one of the perforations. A socket 80 is provided with an elongated slot for receiving the end of the plate 7. Located in the socket slot are bifurcated contacts 82 which are arranged to make a sliding contact with the terminals 7*a* as the plate 7 is inserted in the slot. The bifurcated contacts 82 are brought out through the back of the socket 80 to form a terminal 82*a* which is connected to the connector terminal 19*b* by a lead W″. With the above arrangement, it is possible to remove a plate 7** having a defective circuit and replace it with a spare plate without the necessity of unsoldering any connections.

Figure 5:
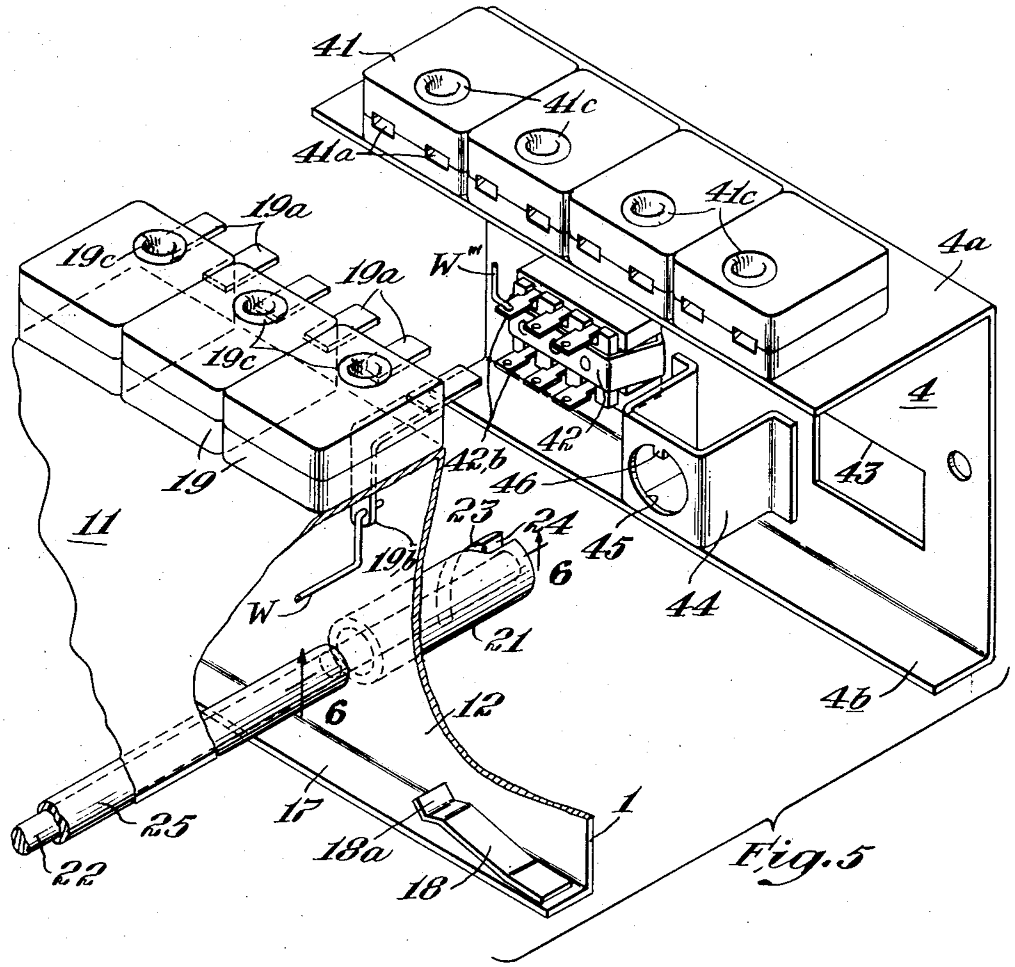
Fig. 5 is a fragmentary isometric view of the rear end of the housing showing details of the detent.

With either the arrangement shown in Fig. 2 or Fig. 8, the terminals **41*b* of the female connectors 41 are linked with the terminals 42*b* of back connectors 42 which, as best shown in Fig. 5, are mounted in apertures 43 in the rear plate 4. The back connectors 42** mate with plug connectors (not shown) which are carried on the ends of multi-conductor cables connecting with external circuits or other chassis as the case may be.

It will be evident that a housing constructed as described above not only presents a neat and attractive appearance but makes servicing of the equipment quicker and easier, as a defective chassis section can be disconnected and withdrawn and a spare section substituted and reconnected in the circuit by a relatively unskilled person in a matter of seconds after the trouble has been determined.

I claim:

1. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs.

2. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, the ends of the flanges of the chassis section being turned inwardly to form lips which slide along the inner surface of the web of the supporting section as the sections are brought into telescoping relationship, an auxiliary panel, and a hinged connection for attaching the panel to the lip of the front chassis section flange so that the panel lies against the front flange.

3. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, the ends of the flange of the chassis section being turned inwardly to form lips which slide along the inner surface of the web of the supporting section as the sections are brought into telescoping relationship, the lip of the front flange of the chassis section being slotted to form two spaced portions, and an auxiliary panel having a tongue extending normally from the plane thereof into the flange slot and a projection formed on either side of the tongue by an undercut so that the projections extend over the top of the lip portions to secure the panel to the chassis section.

4. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, a cross member bridging the flanges of the supporting section at the rear end thereof, said cross member having a centrally disposed socket with a radially inwardly projecting key, and detent means including a shaft journaled in the flanges of the chassis section and a cylindrical cam carried by the shaft adjacent the outer surface of the rear flange, said cam having an axially progressing cammed surface for engaging the socket key to bring and lock the sections in telescoped relationship by the manual rotation of the shaft.

5. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, a terminal board upon which the components are mounted, a U-shaped strip engaging one edge of the terminal board, and detent means carried by the chassis section for detachably securing the correlated ends of the strip to support the terminal board substantially vertically beneath the web portion of the flange of the chassis section.

6. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, a terminal board upon which the components are mounted, a U-shaped member engaging one edge of the terminal board, means carried by the chassis section for securing the U-shaped member to support the terminal board substantially vertically beneath the web portion of the flange of the chassis section, a plurality of electrical connectors carried in the slot of the U-shaped member, and a plurality of mating connectors interconnected with the components and positioned along the edge of the terminal board engaged by the U-shaped member for mating with the connectors in the U-shaped member thereby to interconnect the components mounted on the board with an external circuit.

7. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, and a plurality of separable electrical connectors, the separable portions of each of which are carried by the respective channel shaped sections, the connector portions being aligned automatically to interconnect the components carried by the chassis with an external circuit as the sections are brought into telescoping relationship.

8. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation by movement thereof in any direction other than one parallel to the plane of the webs, and a plurality of bayonet connectors each including two separable body portions, one portion carrying two spaced parallel bayonets being mounted upon one of the sections, the other portion having corresponding bayonet engaging sockets mounted so that the connector portions are brought into engagement for connecting the components with an external circuit as the sections are brought into telescoping relationship.

9. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, a cross member bridging the flanges of the supporting section, and separable electrical connectors mating portions of which are pivotally mounted respectively upon the web of the chassis section and the cross member so that the connector portions are brought into engagement for connecting the components with an external circuit as the sections are brought into telescoping relationship.

10. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, a cross member bridging the flanges of the supporting section, and a plurality of bayonet connectors each including two contact carrying body portions which body portions are pivotally mounted respectively upon the web of the chassis section and the cross member so that the connector portions are brought into engagement for connecting the components with an external circuit as the sections are brought into telescoping relationship, the pivoted mounting compensating for slight misalignment.

11. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, a cross member bridging the flanges at the rear of the supporting section, and detent means carried by the chassis to engage the cross member for bringing and locking the sections in telescoped relationship.

12. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, a cross member bridging the flanges at the rear of the supporting section, and detent means including a cam carried by the chassis, said cross member having a cam engaging surface for bringing and locking the sections in telescoped relationship.

13. A housing for electrical circuit components comprising two telescoping channel shaped sections, one of which is the supporting section whose web and flanges form the enclosing bottom and sides respectively of the housing, the other section being the chassis upon which the electrical components are mounted whose web and flanges form the top and front and rear ends respectively of the housing, the upper edges of the flanges of the supporting section being turned inwardly towards each other parallel to the web to form lips lying over the web of the chassis section to prevent separation of the sections by movement thereof in any direction other than one parallel to the plane of the webs, and a terminal board upon which the components are mounted interposed vertically beneath the web portions between the flanges of the chassis section.

References Cited in the file of this patent

UNITED STATES PATENTS

| | | |
|---|---|---|
| 1,878,017 | Steinmayer | Sept. 20, 1932 |
| 2,488,710 | Cooper | Nov. 22, 1949 |
| 2,514,246 | Knox | July 4, 1950 |
| 2,579,141 | Eckert | Dec. 18, 1951 |
| 2,658,101 | Coxe | Nov. 3, 1953 |
| 2,765,450 | Richardson | Oct. 2, 1956 |